(12) United States Patent
De Freitas et al.

(10) Patent No.: US 9,766,862 B2
(45) Date of Patent: Sep. 19, 2017

(54) EVENT DRIVEN ADAPTIVE USER INTERFACE

(71) Applicant: INTERNATIONAL BUSINESS MACHINES CORPORATION, Armonk, NY (US)

(72) Inventors: Jose A. G. De Freitas, Eastleigh (GB); Guy P. Hindle, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 14/267,233

(22) Filed: May 1, 2014

(65) Prior Publication Data

US 2014/0365907 A1  Dec. 11, 2014

(30) Foreign Application Priority Data

Jun. 10, 2013  (GB) .................................. 1310243.9

(51) Int. Cl.
  *G06F 3/0481* (2013.01)
  *G06F 9/44* (2006.01)

(52) U.S. Cl.
  CPC ...................................... *G06F 8/38* (2013.01)

(58) Field of Classification Search
  None
  See application file for complete search history.

(56) References Cited

U.S. PATENT DOCUMENTS 6,330,499 B1  12/2001  Chou et al.
7,653,721 B1   1/2010  Romanov et al.
7,818,375 B2 * 10/2010  Malik ................. G06Q 10/107
                                                709/224
2002/0010804 A1 *  1/2002  Sanghvi .............. G06F 9/542
                                                719/318
2006/0190822 A1 *  8/2006  Basson ................ G06Q 10/10
                                                715/700

(Continued)

FOREIGN PATENT DOCUMENTS

EP  2045685 A2  4/2009
EP  2442530 A1  4/2012
EP  2466495 A1  6/2012

(Continued)

OTHER PUBLICATIONS

Vitria Technology, Inc., "Complex Event Processing for Operational Intelligence", a Vitria Technical White Paper, Vitria Technology, Inc., 2010, pp. 1-20.

(Continued)

*Primary Examiner* — Mahelet Shiberou
(74) *Attorney, Agent, or Firm* — Law Office of Jim Boice

(57) ABSTRACT

A method and/or computer program product provide an event driven adaptive user interface. A high-level event is received from a high-level event generator. A determination is made as to whether the high-level event is of a registered event type according to a mapping to one or more registered possible action types, where the registered event type and registered possible action types include payload objects with mappings to one or more user interface controls. One or more user interface controls for the high-level event and for possible actions are displayed to a user for selection. The user selection is then processed for the high-level event to initiate zero or more actions.

19 Claims, 4 Drawing Sheets

(56) References Cited

U.S. PATENT DOCUMENTS

| | | |
|---|---|---|
| 2007/0300185 A1 | 12/2007 | MacBeth et al. |
| 2008/0209078 A1 | 8/2008 | Bates et al. |
| 2008/0313282 A1* | 12/2008 | Warila ............... G06F 8/24 709/206 |
| 2009/0204914 A1* | 8/2009 | King ............... G06F 9/542 715/763 |
| 2009/0254860 A1 | 10/2009 | Seo et al. |
| 2010/0043003 A1* | 2/2010 | Valdez ............... G06F 9/542 718/103 |
| 2010/0153313 A1* | 6/2010 | Baldwin ............... G06F 1/1626 706/11 |
| 2012/0158641 A1 | 6/2012 | Klinger et al. |
| 2013/0132566 A1* | 5/2013 | Olsen ............... H04W 4/025 709/224 |
| 2013/0232440 A1 | 9/2013 | Brown et al. |
| 2014/0181715 A1* | 6/2014 | Axelrod ............... G06F 3/0487 715/771 |

FOREIGN PATENT DOCUMENTS

| | | |
|---|---|---|
| WO | 2007026052 A1 | 3/2007 |
| WO | 2012080741 A1 | 6/2012 |

OTHER PUBLICATIONS

A. Mouttham et al., "Event-Driven Data Integration for Personal Health Monitoring", Journal of Emerging Technologies in Web Intelligence, vol. 1, No. 2, Nov. 2009, pp. 110-118.

UK Intellectual Property Office, Search Report for GB Patent Application No. 1310243.9, Mailed Nov. 19, 2013.

H. Obweger et al., "Model-Driven Rule Composition for Event-Based Systems", International Journal of Business Process Integration and Management, vol. 5, No. 4, 2011, pp. 344-357.

T. Ku et al., "Semantics-Based Complex Event Processing for RFID Data Streams", IEEE, First International Symposium on Data, Privacy, and E-Commerce, 2007, pp. 32-34 (Abstract Only).

* cited by examiner

EVENT DRIVEN ADAPTIVE USER INTERFACE

BACKGROUND

This invention relates to the field of adaptive user interfaces. In particular, the invention relates to an event driven adaptive user interface.

The "Internet of Things" is a term that refers to identifiable objects and their virtual representations in an Internet-like structure. Radio-frequency identification is often used in order to tag people and objects in daily life; however, other forms of identification of things may be used such as barcodes, 2d-codes, etc.

The Internet of Things requires the capability to respond to large volumes of stimuli in an effective way. For example, at any given time a user's house, car, health monitoring sensors, children, etc. may be generating a large number of events that the user may need to respond to.

Traditional menu driven applications for a user to initiate response do not work well in a world where application boundaries are fuzzy and options may number in the thousands. Adaptive User Interfaces (AUIs) may be used to reduce navigational complexity but this approach requires that application states and contexts be known a priori, which may often not be feasible or practical.

SUMMARY

In one embodiment of the present invention, a method and/or computer program product provide an event driven adaptive user interface. A high-level event is received from a high-level event generator. A determination is made as to whether the high-level event is of a registered event type according to a mapping to one or more registered possible action types, where the registered event type and registered possible action types include payload objects with mappings to one or more user interface controls. One or more user interface controls for the high-level event and for possible actions are displayed to a user for selection. The user selection is then processed for the high-level event to initiate zero or more actions.

In one embodiment of the present invention, an event driven adaptive user interface comprises: an event queue for receiving a high-level event from a high-level event generator; an event registry of events, of a registered event type, mapped to one or more registered possible action types, wherein the registered event types and the possible action types include payload objects with mappings to one or more user interface controls; an event processor for displaying the one or more user interface controls for the high-level event and for possible actions to a user for selection; and an action processor for mapping a user selection for the high-level event to initiate zero or more actions.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

DETAILED DESCRIPTION

Figure 1:
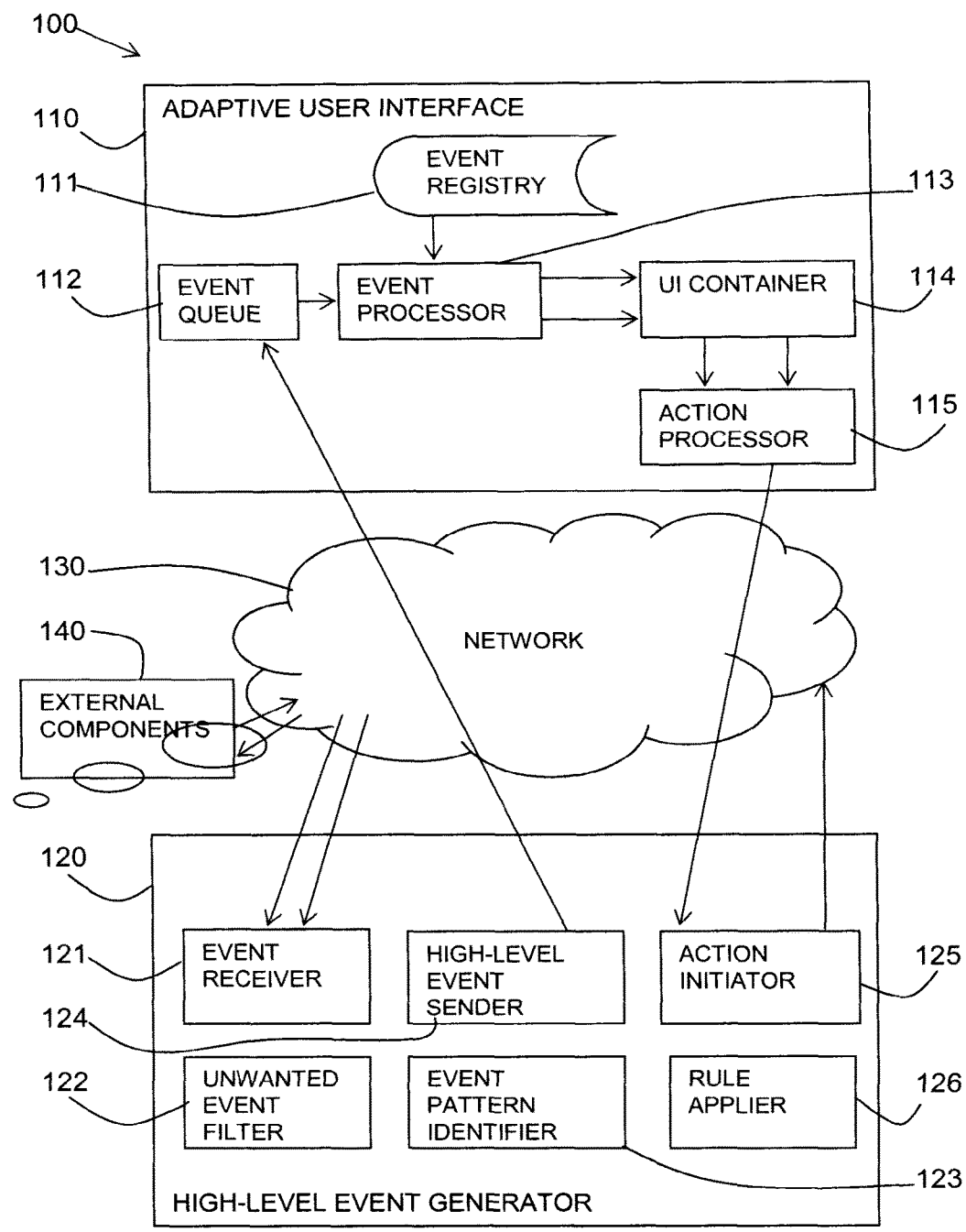
FIG. 1 is block diagram of an example embodiment of a system in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

To address the problem of providing a user interface for response to events, a mechanism is proposed consisting of a generic event driven adaptive user interface (AUI) coupled with an high-level event generator in the form of a complex event processing (CEP) engine or machine learning component. This approach does not require user interface navigation and is application agnostic. Furthermore, the use of a CEP engine or machine learning component ensures that large numbers of events can be analyzed and filtered and that only context relevant high-level events are sent to the AUI.

The described method and system dynamically change the AUI based on incoming events, as well as those events being produced by the user. Events produced by the user at the AUI may be fed back into a CEP engine as the user responds to the AUI. The result is a much more generic and flexible user interface mechanism, whose applications are much broader than business activity monitoring.

An event represents the occurrence of a "situation" at a certain point in time. The description of an event typically consists of data that identifies the when and where of the event as well as the specific properties, sometimes referred to as the event payload, that characterize that situation. The event payload may be described by a schema or, in an alternative embodiment, it may have annotations that identify the type of content.

A high-level event generator and an AUI may work together to provide an adaptive user interface solution. Selection of what is to be presented to the user starts in the high-level event generator. In a sense the high-level event generator is "adapting" to a constantly changing user context. The AUI component itself adapts to different event types, actions and user preferences. Notwithstanding, the case where a user may not be able to respond to a critical event (and therefore automatic actions may be triggered), as well as the case where the user may elect to "automate" his/her responses to certain type of events, may also be addressed by the described system. In the first case, it is likely that a high-level event generator in the form of a CEP engine will execute the action(s) itself.

In the broadest sense, an action is a response to an event. As far as the AUI component is concerned, in the majority of cases an action is just an outgoing event that may be sent to the CEP engine for additional processing. In some cases, an action may perform a task in the user's device, for example, write information contained in the incoming event to the local file system. Like any event, an action may have a payload. The action payload may consist of data provided by the user, data obtained from the user's device or data from the incoming event.

Referring to FIG. 1, a block diagram shows an example embodiment of the described system 100.

The system 100 comprises a generic event driven adaptive user interface (AUI) 110 which may be coupled to a high-level event generator 120, for example in the form of a complex event processing (CEP) engine or a machine learning component.

A high-level event generator 120 may be a CEP engine or a machine learning component both of which may identify patterns of events that may be of relevance in a particular user context. Once such a pattern is identified, a high-level event may be sent by the high-level event generator to the AUI 110.

In a CEP engine 120, pattern identification is based on predefined business rules that typically apply to aggregations of correlated data. A known CEP engine is the Events Server component in the IBM Operational Decision Manager product (IBM is a trade mark of International Business Machines Corporation).

Complex event processing analyses multiple events over a specific period of time, detecting complex patterns and making correlations. Complex event processing technology is useful for processing in real time potentially high volumes of low-level events and transforming these low-level events into higher-level, aggregated and composite events.

Complex event processing is a method of tracking and analyzing streams of information or data relating to events, and deriving a conclusion from them. Complex event processing combines data from multiple sources to infer events or patterns that often suggest complicated circumstances. The aim of complex event processing is to identify meaningful events (such as opportunities or threats) and to enable a user to respond to them as quickly as possible.

Machine learning techniques, in particular those related to pattern recognition, are applicable to situations where the variability of the data is such that the use of rules would be impractical because of the potentially very large number of rules that would be required. In those situations, a set of data (called a training set) may be used to tune the parameters of an adaptive model. The expectation is that using this approach, patterns that do not differ significantly from those used in training will also be detected. Machine learning capabilities are known in the IBM SPSS predictive analytics software product.

In both embodiments, the events may be happening across various layers of an organization such as sales leads, orders or customer service calls. In other examples, the events may be news items, text messages, social media posts, stock market feeds, traffic reports, weather reports, or other kinds of data. An event may also be defined as a "change of state", for example, when a measurement exceeds a predefined threshold of time, temperature, or other value.

The AUI 110 and high-level event generator 120 may be coupled remotely via a network 130. The network 130 may be in communication with external components 140 which may generate events which are received by the high-level event generator 120.

The high-level event generator 120 may be a known CEP engine the purpose of which is to filter unwanted events, to identify patterns and to send high-level events that are relevant to the current user context to the AUI 110. Alternatively, the high-level event generator 120 may be a machine learning component may be used for certain applications where an adaptive model is used for pattern recognition of events to generate high-level events to be sent to the AUI 110.

The high-level event generator 120 may include an event receiver 121 for receiving events, for example, via a network 130 from external components 140. The high-level event generator 120 may include one or more of event processing components such as an unwanted event filter 122, an event pattern identifier 123, a rule applier 126 (in the case of a CEP engine) and components for other forms of event analysis and processing including, for example, analytics and machine learning.

The high-level event generator 120 may also include a high-level event sender 124 for sending the processed high-level events which are the output of the event processing components 122, 123, 126 to the AUI 110. The high-level event generator 120 may be remote to the device containing the AUI 110 and, optionally, the high-level events may be encrypted for sending to the remote AUI 110.

The high-level event generator 120 may also include an action initiator 125 for initiating actions in response to feedback from the AUI 110 as discussed further below.

A generic adaptive AUI 110 may be coupled to and driven by the high-level event generator 120 and receives high-level events from the high-level event sender 124 of the high-level event generator 120. The AUI 110 may map a received high-level event to one or more UI controls for a user response.

The generic AUI 110 may include an event registry 111 that may be configured to map an event to one or more UI controls and to map the event together with the user response to zero or more actions. Optionally, the registry may also contain metadata to interpret the event payload.

The event registry 111 may consist of a database that describes the event to action mappings and the mappings of data objects in events and actions to UI controls. Event to action mappings may be configured to trigger automatically or they may be configured to appear as choices in the user interface. In addition, the event registry 111 may also store payload descriptors, which in the absence of metadata in the event itself, may be used to describe the payload. In the case of actions, the payload descriptors may also describe how the data is to be obtained.

The event registry 111 may also comprise an Application Programming Interface (API) to manage mappings and any other data contained in the registry.

In an alternative embodiment, the event registry 111 may be replaced by a rules engine.

The AUI 110 may include an event queue 112 for receiving high-level events from a high-level event sender 124 of the CEP engine 120. The event queue 112 may, optionally, take priorities into account.

The AUI 110 may include an event processor 113 to choose and create UI controls for events from the event queue 112 based on the event registry 111. The event processor 113 may use the event registry API, to establish what actions should be performed in response to the arrival of known event types. The event processor 113 may also define policies that regulate the life cycle of events.

A UI container 114 may be provided to house supported UI controls. The event processor 113 may send selected control IDs for events to the UI container 114.

UI controls may be user interface components that are managed by the UI container 114. UI controls for incoming events may be typically used for showing the event payload to the user (usually text or images) and may range in complexity from a simple non-editable text control to browser-like capabilities. UI controls for actions are typically controls that accept input, such as editable text boxes, radio buttons, editors or any composite of such controls.

The UI container 114 may consist of a framework for executing and laying out the UI controls that are used to display data from events and to accept user input for actions. The UI container 114 may display the event payload (or a relevant subset of the event payload) using the UI controls defined in the UI control mappings. It also displays the actions together with related UI controls (for example, a check box for each action plus submit and cancel buttons), and any UI controls that may be needed to allow the user to provide input for the action (if required). The UI container 114 may also show the event queue 112 and allow the user to select events in a preemptive way.

An action processor 115 may be provided to select the actions based on the user choice and to initiate zero or more actions or corresponding "action" events. The action processor 115 may ensure that all inputs required by an action, including inputs obtained automatically from the local device and from the incoming event, are provided. The action processor 115 may perform the action by invoking a local or remote service, or by sending an event to the CEP engine 120. The selected actions may be transmitted back to the CEP engine 120 for action initiating by the action initiator 125.

An adaptive user interface (AUI) is a user interface which adapts its layout and elements to the needs of the user or context and is similarly alterable by each user. These mutually reciprocal qualities of both adapting and being adaptable are, in a true AUI, also innate to elements that comprise the interface's components; portions of the interface might adapt to and affect other portions of the interface.

The advantages of an adaptive user interface are found within its ability to conform to a users needs. The properties of an AUI allow the UI to show only relevant information based on the current user. This creates less confusion for less experienced users and provides ease of access throughout a system.

Figure 2:
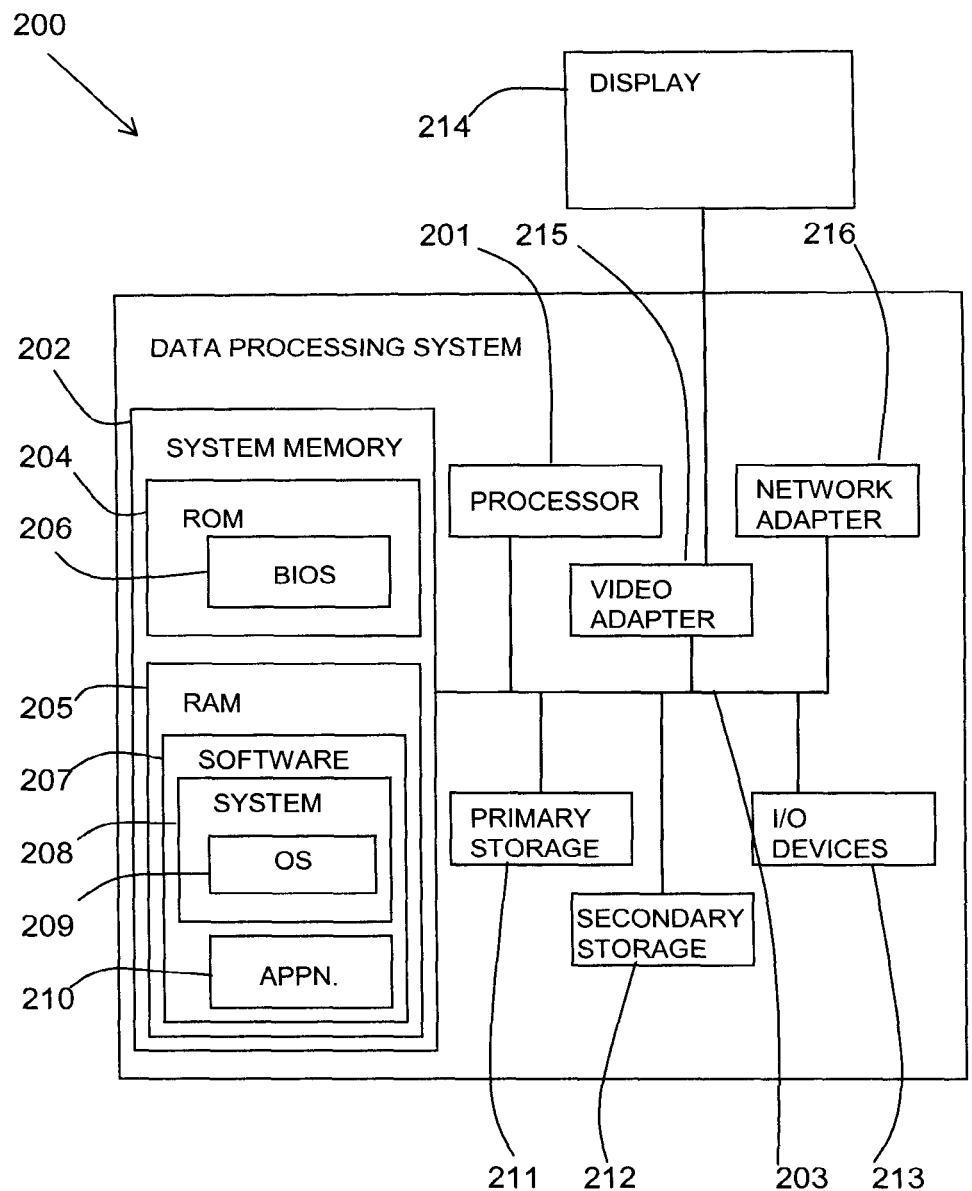
FIG. 2 is a block diagram of an embodiment of a computer system in which the present invention may be implemented.

Referring to FIG. 2, an exemplary system for implementing aspects of the invention includes a data processing system 200 suitable for storing and/or executing program code including at least one processor 201 coupled directly or indirectly to memory elements through a bus system 203. The memory elements may include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 may be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Figure 3:
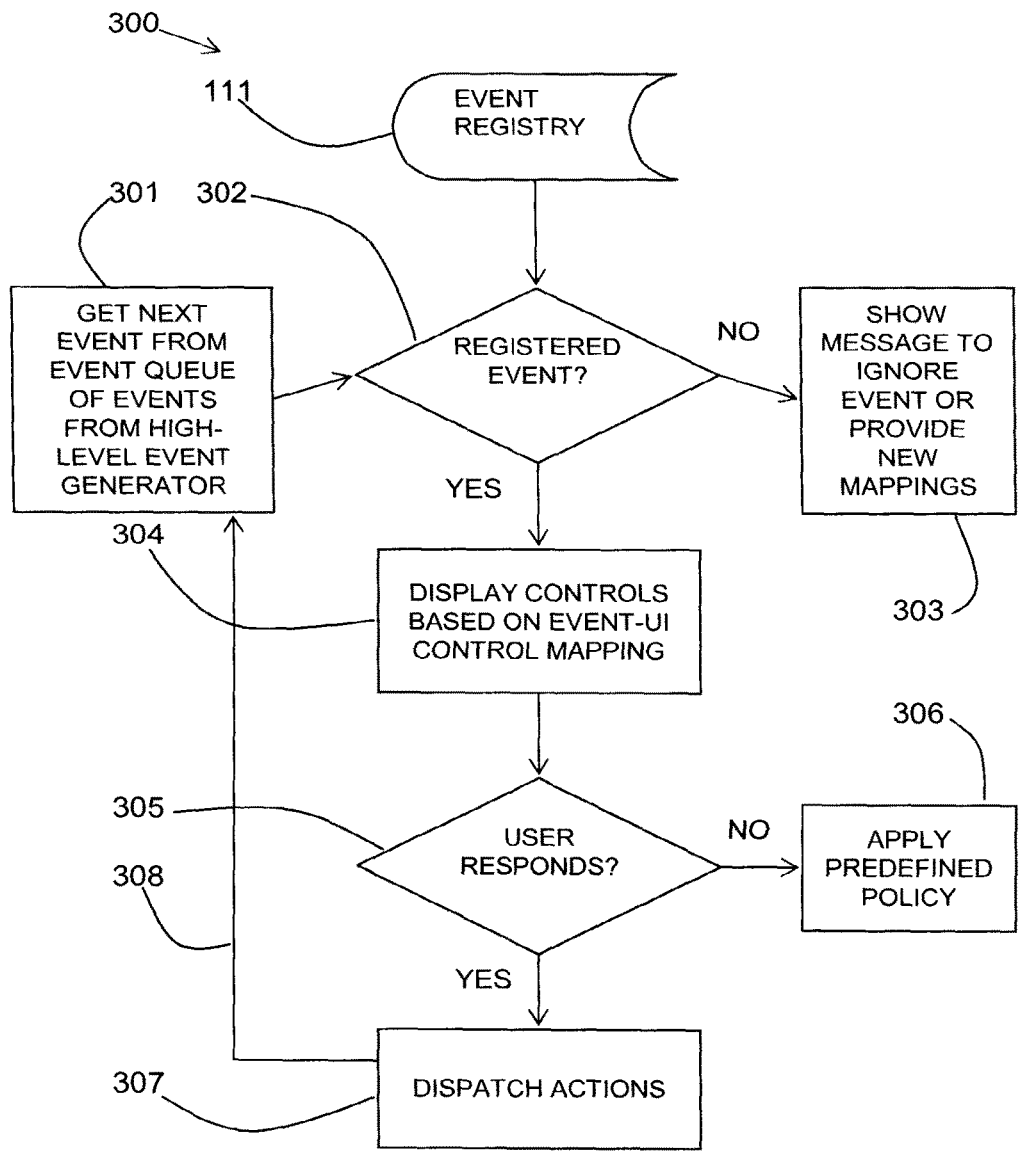
FIG. 3 is a flow diagram of an example embodiment of an aspect of a method in accordance with the present invention.

Referring to FIG. 3, a flow diagram 300 shows an embodiment of the described method.

A high-level event generator receives, filters, applies rules, and/or otherwise analyses events and generates high-level events destined for the AUI. High-level events may be received from the high-level event generator at an AUI and stored in an event queue.

When an event reaches a device that contains the AUI, it is placed in the event queue. The event processor may get 301 the event from the queue for processing based on the order of arrival or priority. A normal or low priority event is kept in the queue until the user finishes his/her current work, or until all previous events of similar or higher priority have been processed. A high priority event may be selected for immediate processing and may interrupt current user UI activity, or automatically trigger an action without user intervention. The existence of a queue management sub-component is therefore implied, but because such components are well know it is not discussed further.

The generic event driven AUI may have an event registry 111 that may be configured to map an event to one or more UI controls and to map the event together with the user response to zero or more actions.

The event processor may use an event type identifier in the event (an event type represents a category of events that are processed in the same way) to search the event registry 111 for one or more event type to action mappings. The event registry 111 may keep information on how specific data types or data objects in the event and action payloads map to UI controls. Data types may be described in a schema, through annotations or any other suitable/standard way. Default UI control mappings may typically be made available based on this metadata and standard UI controls, but in some applications power users may define new mappings.

It may be determined 302 if the event is registered. If it is not a registered event, a message may be shown 303 to a user to ignore the event. If no event type to action mapping is found when the event type is searched in the registry, the user may also be given the choice to specify new event to action mappings.

The UI container may then receive the event data, actions and data to control mappings from the event processor and dynamically creates 304 the user interface.

A user may be given an opportunity to respond 305 to an event after it is displayed in the UI. The system may wait a preconfigured amount of time for the user response. If the user does not respond, a predefined policy may be applied 306, such as reinserting the event into the queue or discarding it. If the user does respond, an event ID and the user selected response may be used to locate the appropriate action(s) in the event registry.

The user may provide inputs and submit actions to the action processor. The action processor may have access to the event data and to metadata (contained in the registry) describing how action inputs are obtained. For example, inputs may come from the incoming event, user input or the user device services. Some of these services may be fairly standard (such as GPS services) enabling the action processor to implement standard interfaces to such services. In some cases access to local services, such as access to a database with personal information, may require custom implementation and/or configuration.

Actions may be packaged in such a way that they can be downloaded or updated from remote sites as individual artifacts. In addition, a complete registry configuration consisting of multiple event to action and UI control mappings, as well as specific UI controls may be provided as an "event application".

The method may dispatch 307 the action and the method may loop 308 to process the next event.

The high-level event generator may execute actions resulting from events coming from the generic event driven AUI.

Figure 4:
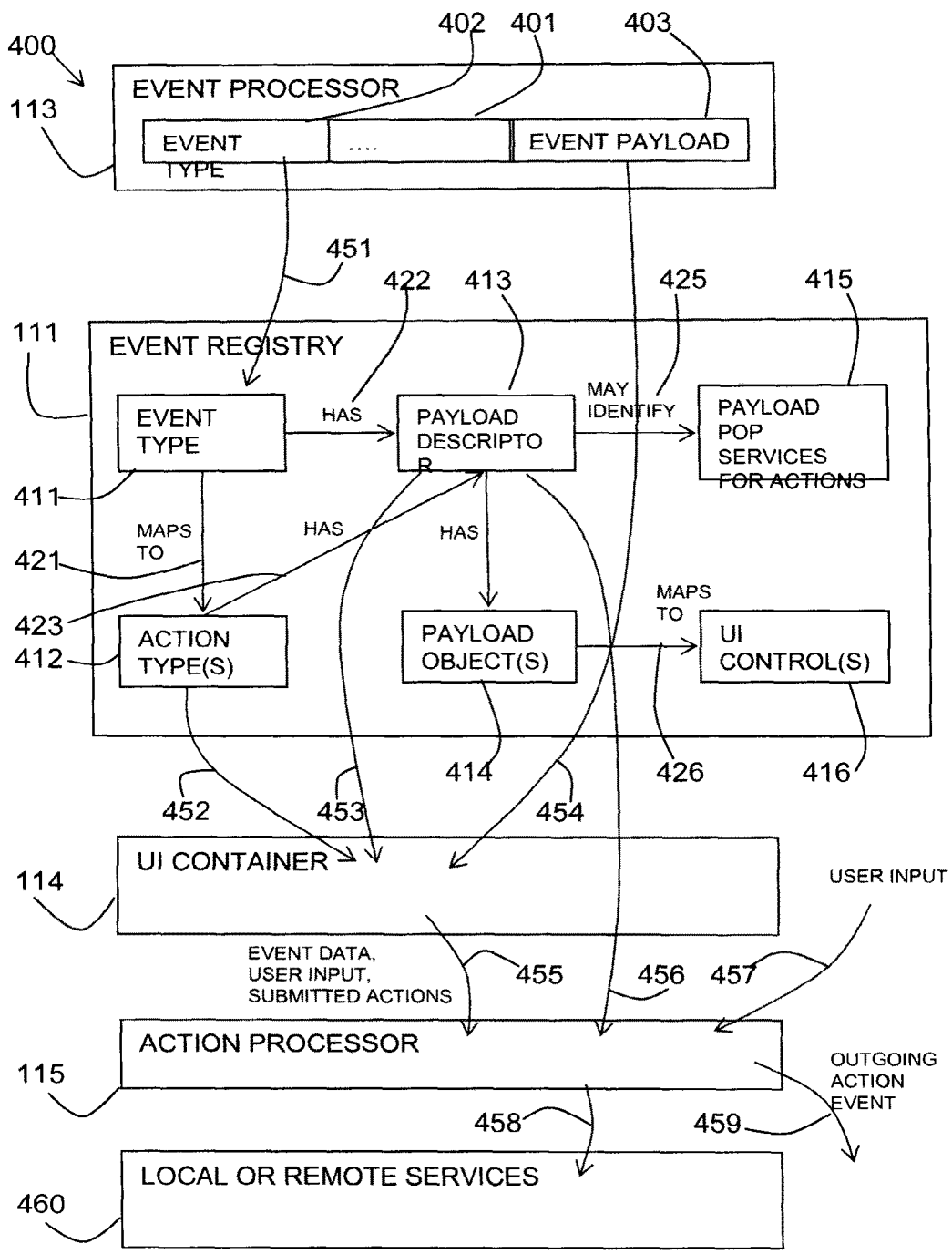
FIG. 4 is a schematic flow diagram of an embodiment of a method shown in conjunction with a system in accordance with the present invention.

Referring to FIG. 4, a system flow diagram 400 shows an embodiment of a flow of actions through the components of the example generic event driven adaptive user interface 110 of FIG. 1.

The event processor 113 may receive an event 401 including an event type 402, and an event payload 403. The event processor 113 may use 451 the event type 402 to search the event registry 111 for the event type 411 to find mappings for the event type 411.

The event registry 111 may include: event type 411 to action type(s) 412 mappings 421; event type 411 to event payload descriptor 413 mappings 422; action type(s) to action payload descriptor 412 mappings 423; and payload descriptor 413 to payload object(s) 414 mappings 414.

The event and action payload descriptors 413 may be used to describe an event payload 403 or an action payload and may point to payload object(s) 414 in the event and action payloads which may be mapped 426 to UI control(s) 416.

The payload descriptor 413 may also identify 425 payload population services for actions 415. These may be a set of optional services that may be used to populate the action payload so that the user does not have to manually provide the input. For example, it may identify a service that fetches GPS coordinates to be included in the action payload.

The UI container 114 may receive inputs 454, 452, 453 of the event payload 403 from the event processor 113, and action type(s) 413 and payload descriptors 414 from the event registry 111. The UI container 114 may dynamically create a UI with controls based on these inputs.

The action processor 115 may receive inputs 455, 456, 457 from the UI container 114 of event data, from the payload descriptor 413 of the event registry 111, and of user inputs from the UI. The outputs 458, 459 of the action processor 115 are outgoing action events to local or remote services 460 or to other destinations.

Example 1

This example highlights the case where events may automatically trigger actions.

Following a car accident, vital signs sensors and other sensors send events to a CEP engine (via a gateway), which may detect a situation that may require a user response. In the case that it is a critical situation, the CEP engine may decide to automatically initiate its own response. Otherwise the CEP engine may generates high-level emergency events which may be received at the AUI.

The method shown in FIG. 3 may then be carried out starting with getting 301 the high-level emergency events from the event queue of the AUI. User controls may be displayed 304 based on event to UI control mappings which may present the user with a choice of relevant actions, such as:

call/send message to an ambulance service (with information about the location, medical alerts and conditions—such as diabetes, allergies, etc.);

call/send message to the police;

notify a next-of-kin (for example, send an SMS based on a template);

notify the insurance company (for example, send a predefined email with relevant information—such as the location of the accident—automatically filled in);

call/send message to a preferred tow truck service.

This scenario may require the invocation of an action without user intervention, if the event is deemed critical. In other scenarios, the user may also decide, through configurations, that a particular action will be automatically executed just because it is habitual.

An interesting observation about the scenario above is that, for example, the action "call/send a message to a preferred tow truck service" is the invocation of a service that may be provided by many different companies. A mobile device application implementing the AUI may download actions (representing service invocations) for user consumption. This coupled with a potential deployment of the CEP engine as a "cloud" service may result in a very high value business model.

Example 2

Yet another high value application of the described method is in "Goals-driven" Business Process Management (BPM). As the majority of real-life business processes are not entirely predictable and cannot be modelled as a fixed, finite sequence of steps and decisions, current process modelling tools and BPM environments will likely not be able to meet the challenge of the ever increasing complexity and variability of the business processes of the future. The described method could be used to implement a goals-driven approach to BPM, where the actions that a user (or group of users) takes—actions are constrained by user context, policies and goals—are used as input to a machine learning component. This approach requires little or no process modelling and allows for the automatic recording and resolution of situations that could not have been predicted at modelling time.

An approval process is considered, which is common in business process management. At a certain point in the execution of a process instance, the CEP engine receives events and determines that an approval action is required.

The CEP engine determines from the context that:

1) User A has the right role to perform the approval (this is a business rule); and 2) That user A is available.

The CEP engine sends a high-level event in the form of an "approval event" to user A's computer/device. The approval event contains information on what needs to be approved and relevant process instance information. The method of FIG. 3 may then be carried out to enable the AUI to select the appropriate UI controls to display the information.

The AUI may also display the controls needed for the action input, for example, a check box for approval/rejection and a text box for comments (optionally, an electronic signature may be provided).

The AUI may send the "approval action" back to the CEP engine, which may in turn cause other actions/events in the process to be triggered.

Example 3

Using a further simple example, an elderly parent who lives alone may enter a kitchen and a motion event may be sent to the CEP engine. No more motion events may then detected in the house for the next 5 minutes. The CEP engine may detect this pattern and through a high-level event presents the user with the UI that will enable the user to be aware of and respond to this potentially critical situation.

The described method and system include an AUI driven by a high-level event generator. The driver of the UI may not be a single event (as an alert in a dashboard or the triggering of a fire detector) or a user initiated action (such as a user navigating to a particular part of the dashboard to look at the information he is interested in at that point in time). The described method is a UI that is driven by a pattern of events that happen over time (wherein an event may be a positive occurrence or a lack of occurrence) which have resulted in a high-level event trigger.

Making the UI simple and generic means that the same mechanism may be used for a wide variety of applications.

As described herein and according to a first aspect of the present invention there is provided a method for providing event driven adaptive user interface, comprising: receiving an high-level event from a high-level event generator; determining if the event is a registered event type with a mapping to one or more registered possible action types, wherein the event type and action type include payload objects with mappings to one or more user interface controls; displaying the one or more user interface controls for the event and for possible actions to a user for selection; and processing a user selection for the event to initiate zero or more actions.

The method may include establishing the user context by means of a high-level event generator in the form of a complex event processing engine or machine learning component to fire a time and context relevant high-level event.

Displaying the one or more user interface controls for the event and for possible actions to a user for selection may include automatic selection without user input based on predefined rules.

The method may include providing an event registry for: mapping an event type to one or more action types, wherein the event type and action types have payload objects; mapping payload objects to user interface controls; and mapping an event and user interface controls to zero or more actions. Providing an event registry may include the registry having metadata to interpret event and action payloads. Providing an event registry may include storing payload descriptors which describe the event and/or action payload.

The method may include queuing received events from a complex event processing engine; and prioritizing queued events.

The method may include: determining if a received event is a registered event; and if it is not a registered event, displaying a message to the user to ignore the event.

The method may include: determining if a received event is a registered event; and if it is a registered event, adding the one or more user interface controls to a user interface container and displaying the controls to a user for selection.

The method may include waiting for a predetermined period of time for a user response to displaying the registered one or more user interface controls for an event. If no user response is received in the predetermined period, the method may apply a predefined policy.

The method may include dispatching a registered action to a complex event processing engine.

According to a second aspect of the present invention there is provided an event driven adaptive user interface, comprising: an event queue for receiving a high-level event from a high-level event generator; an event registry of event with a mapping to one or more registered possible action types, wherein the event type and action type include payload objects with mappings to one or more user interface controls; an event processor for displaying the one or more user interface controls for an event and for possible actions to a user for selection; and an action processor for mapping a user selection for the event to initiate zero or more actions.

According to a third aspect of the present invention there is provided a system including an event driven adaptive user interface of the second aspect of the present invention and a high-level event generator in the form of a complex event processing engine or machine learning component for establishing the user context to fire a time and context relevant high-level event.

The event processor for displaying the one or more user interface controls for the event and for possible actions to a user for selection may include an automatic selection component for automatic selection without user input based on predefined rules.

The event registry may include: a mapping of an event type to one or more action types, wherein the event type and action types have payload objects; a mapping of payload objects to user interface controls; and a mapping of an event and user interface controls to zero or more actions. The event registry may include metadata to interpret event payloads. The event registry may include payload descriptors which describe the event and/or action payload.

The event queue may be for prioritizing queued events.

The event processor may be for adding the one or more user interface controls to a user interface container and displaying the controls to a user for selection.

The event processor may be for waiting for a predetermined period of time for a user response to displaying the registered one or more user interface controls for an event.

The action processor may be for dispatching a registered action to a complex event processing engine.

According to a fourth aspect of the present invention there is provided a computer program product for providing event driven adaptive user interface, the computer program product comprising: a computer readable storage medium readable by a processing circuit and storing instructions for execution by the processing circuit for performing a method according to the first aspect of the present invention.

According to a fifth aspect of the present invention there is provided a computer program stored on a computer readable medium and loadable into the internal memory of a digital computer, comprising software code portions, when said program is run on a computer, for performing the method of the first aspect of the present invention.

According to a sixth aspect of the present invention there is provided a method substantially as described with reference to the figures.

According to a seventh aspect of the present invention there is provided a system substantially as described with reference to the figures.

The described aspects of the invention provide the advantage of providing a generic and flexible user interface which only displays relevant information and choices to a user.

Method and system are provided for providing event driven adaptive user interface, comprising: receiving a high-level event from a high-level event generator in the form of a complex event processing engine or machine learning component; determining if the event is a registered event type with a mapping to one or more registered possible action types, wherein the event type and action type include payload objects with mappings to one or more user interface controls; displaying the one or more user interface controls for the event and for possible actions to a user for selection; and processing a user selection for the event to a initiate zero or more actions. The method may also include establishing the user context by means of a complex event processing engine or machine learning component to fire a time and context relevant high-level event.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of the present invention.

What is claimed is:

1. A method for providing an event driven adaptive user interface, the method comprising:
    establishing, by one or more processors, a user context by means of a high-level event generator in a form of a complex event processing (CEP) engine, wherein the high-level event generator is a CEP engine that identifies current event patterns in order to identify the user context and a high-level event that is relevant to a particular user context for a particular user, wherein the particular user context identifies a current state of the particular user, and wherein the event patterns are identified based on predefined business rules for aggregating event patterns that are derived from disparate types of events;
    receiving, by one or more processors, a high-level event from the high-level event generator;
    determining, by one or more processors, if the high-level event is of a registered event type according to a mapping to one or more registered possible action types, wherein the registered event type and registered possible action types include payload objects with mappings to one or more user interface controls, wherein the one or more user interface controls receive user inputs;
    displaying, by one or more processors, the one or more user interface controls for the high-level event and for possible actions to a user for selection;
    processing, by one or more processors, a user selection for the high-level event to initiate one or more actions to change an appearance of an adaptive user interface (AUI);
    receiving, by one or more processors, a low priority event, wherein the low priority event has a lower priority for execution than the high-level event;
    storing, by one or more processors, the low priority event in a queue until the user finishes current work using the AUI whose changes were caused by the user selection for the high-level event; and
    delaying, by one or more processors, any changes to the appearance of the AUI until the user finishes current work using the AUI whose changes were caused by the user selection for the high-level event.

2. The method as claimed in claim 1, wherein displaying the one or more user interface controls for the high-level event and for possible actions to the user for selection includes automatic selection without user input based on predefined rules.

3. The method as claimed in claim 1, further comprising:
    providing, by one or more processors, an event registry for:
        mapping an event type to one or more action types, wherein the event type and action types have payload objects;
        mapping the payload objects to user interface controls; and
        mapping an event and user interface controls to zero or more actions.

4. The method as claimed in claim 3, wherein providing an event registry includes the event registry having metadata to interpret event and action payloads.

5. The method as claimed in claim 4, further comprising:
    providing, by one or more processors, an event registry for:
        storing payload descriptors which describe the event and action payloads.

6. The method as claimed in claim 1, further comprising:
    queuing, by one or more processors, received events from a complex event processing engine; and
    prioritizing, by one or more processors, queued events.

7. The method as claimed in claim 1, further comprising:
    determining, by one or more processors, whether a received event is a registered event; and
    in response to the received event not being a registered event, displaying, by one or more processors, a message to the user to ignore the received event.

8. The method as claimed in claim 1, further comprising:
    determining, by one or more processors, if a received event is a registered event; and
    in response to the received event being a registered event, adding, by one or more processors, the one or more user interface controls to a user interface container and displaying the one or more user interface controls to the user for selection.

9. The method as claimed in claim 1, further comprising:
    waiting, by one or more processors, for a predetermined period of time for a user response to an event before displaying the one or more user interface controls for the event; and
    in response to no user response being received in the predetermined period of time, applying, by one or more processors, a predefined policy to reinsert the event into an event queue for future processing to alter the appearance of the AUI.

10. The method as claimed in claim 1, further comprising:
    in response to determining that the high-level event is not of the registered event type, ignoring, by one or more processors, the high-level event.

11. The method as claimed in claim 1, further comprising:
    dispatching, by one or more processors, a registered action to a complex event processing engine.

12. An event driven adaptive user interface, comprising:
    a high-level event generator for establishing a user context, wherein the high-level event generator is a complex event processing (CEP) engine that identifies real time event patterns in order to identify the user context and a high-level event that is relevant to a particular user context for a particular user, wherein the user context identifies a current state of the particular user, wherein the event patterns are identified based on predefined business rules for aggregating event patterns that are derived from disparate types of events, and wherein the CEP engine fires a time and context relevant high-level event for the particular user;

an event queue for receiving a high-level event from the high-level event generator;

an event registry of events, of a registered event type, mapped to one or more registered possible action types, wherein the registered event types and the possible action types include payload objects with mappings to one or more user interface controls, wherein the one or more user interface controls receive user inputs;

an event processor for displaying the one or more user interface controls for the high-level event and for possible actions to a user for selection;

an action processor for mapping a user selection for the high-level event to initiate one or more actions that dynamically change an adaptive user interface (AUI) based on the user selection of one or more of the possible actions; and one or more processors for:
receiving a low priority event, wherein the low priority event has a lower priority for execution than the high-level event;
storing the low priority event in a queue until the user finishes current work using the AUI whose changes were caused by the user selection for the high-level event; and
delaying any changes to the appearance of the AUI until the user finishes current work using the AUI whose changes were caused by the user selection for the high-level event.

13. The user interface as claimed in claim 12, wherein the event processor for displaying the one or more user interface controls for the high-level event and for possible actions to the user for selection includes an automatic selection component for automatic selection without user input based on predefined rules.

14. The user interface as claimed in claim 12, wherein the event registry includes:
a mapping of an event type to one or more action types, wherein the event type and the one or more action types have payload objects;
a mapping of the payload objects to user interface controls; and
a mapping of an event and user interface controls to zero or more actions.

15. The user interface as claimed in claim 12, wherein the event registry includes metadata to interpret event payloads.

16. The user interface as claimed in claim 12, wherein the event registry includes:

payload descriptors which describe the high-level event and/or an action payload.

17. A method comprising:
receiving, by a complex event processor engine (CEPE), a plurality of low level events with each low level event of the plurality of low level events representing a set of related operation(s) performed in a first computer system for a user;
determining, by machine logic based high-level-event-detection rules of the CEPE, a first high level event based upon at least some of the plurality of low level events, with the first high level event being a meta operation made up of multiple low level operations;
determining, by machine logic based user-interface-relevance rules of the CEPE, that the first high level event is relevant to a way a first user interface (UI) operates, wherein one or more user interface controls on the first UI receive user inputs; and
responsive to the determination that the first high level event is relevant to the way the first user interface (UI) operates, adapting the first user interface by changing an appearance of the first user interface to create an adaptive user interface (AUI) in order to facilitate disposal of the first high level event by the user;
receiving, by one or more processors, a low priority event, wherein the low priority event has a lower priority for execution than the high-level event;
storing, by one or more processors, the low priority event in a queue until the user finishes current work using the AUI whose changes were caused by a user selection for the high-level event; and
delaying, by one or more processors, any changes to the appearance of the AUI until the user finishes current work using the AUI whose changes were caused by the user selection for the high-level event.

18. The method of claim 17 wherein:
the first high level event is an emergency situation; and
the adaptation to the first user interface is an adaptation that facilitates the summoning of emergency assistance services by the user.

19. The method of claim 17 wherein:
the first high level event is a request for approval mandated by a predetermined business process; and
the adaptation to the first user interface is an adaptation that facilitates an approval to the request for approval by the user.

* * * * *